(12) United States Patent
Gennello

(10) Patent No.: US 9,157,812 B1
(45) Date of Patent: Oct. 13, 2015

(54) TEMPERATURE MONITORING AND DISPLAY SYSTEM FOR DATA CENTERS

(71) Applicant: DCIM Solutions, LLC, Austin, TX (US)

(72) Inventor: Anthony W. Gennello, Marlton, NJ (US)

(73) Assignee: DCIM Solutions, LLC, Austin, TX (US)

( * ) Notice: Subject to any disclaimer, the term of this patent is extended or adjusted under 35 U.S.C. 154(b) by 297 days.

(21) Appl. No.: 13/838,828

(22) Filed: Mar. 15, 2013

Related U.S. Application Data

(60) Provisional application No. 61/611,743, filed on Mar. 16, 2012.

(51) Int. Cl.
*G01K 13/00* (2006.01)

(52) U.S. Cl.
CPC ........................ *G01K 13/00* (2013.01)

(58) Field of Classification Search
CPC ............... H01L 2924/0002; H01L 2924/00; H01L 23/481; H01L 2225/06513; H01L 2225/06541; H01L 22/34; H01L 23/34; H01L 25/0657; H01L 2224/16; H01L 2224/16145; H01L 2224/16225; H01L 2225/06517

USPC ......................................................... 374/152
See application file for complete search history.

(56) References Cited

U.S. PATENT DOCUMENTS

| | | | |
|---|---|---|---|
| 7,248,942 B2 * | 7/2007 | Bash et al. ................... 700/213 |
| 7,577,862 B2 * | 8/2009 | McClendon et al. ......... 713/500 |
| 8,009,430 B2 * | 8/2011 | Claassen et al. .............. 361/724 |
| 8,113,012 B2 * | 2/2012 | Hoeft et al. .................... 62/407 |
| 8,550,702 B2 * | 10/2013 | Campbell et al. ................ 374/1 |
| 8,596,079 B2 * | 12/2013 | Beam .............................. 62/186 |
| 8,830,672 B2 * | 9/2014 | Alshinnawi et al. ..... 361/679.47 |

\* cited by examiner

*Primary Examiner* — Lisa Caputo
*Assistant Examiner* — Jamel Williams
(74) *Attorney, Agent, or Firm* — William D. Wiese; DuBois, Bryant & Campbell LLP

(57) ABSTRACT

A temperature monitoring and display system for use in data centers includes a magnetic layer that attaches to a server cabinet of a data center, and a flexible printed circuit board (FPCB). A plurality of lighting units and temperature sensors are mounted to the FPCB. An integrated controller of the temperature monitoring and display system receives temperature signals from the temperature sensors and, based on those signals, controls the lighting units to output predetermined colors.

19 Claims, 10 Drawing Sheets

High Sensitivity Level — 700a

| LED output color | Blue | Blue-Green | Green | | Green-Yellow | Yellow | | Orange | | Red |
|---|---|---|---|---|---|---|---|---|---|---|
| Detected Temperature (°F) | ≤69.8 | 71.0 | 73.0 | 75.0 | 77.0 | 79.0 | 81.0 | 83.0 | 84.0 | 85.0 | 87.0 | 89.0 | 91.0 | 93.0 | ≥95.0 |

Mid (Default) Sensitivity Level — 700b

| LED output color | Blue | Blue-Green | Green | | Green-Yellow | Yellow | | Orange | | Red |
|---|---|---|---|---|---|---|---|---|---|---|
| Detected Temperature (°F) | ≤64.8 | 66.0 | 67.0 | 69.0 | 71.0 | 73.0 | 75.0 | 77.0 | 78.0 | 80.0 | 82.0 | 84.0 | 86.0 | 88.0 | ≥90.0 |

Low Sensitivity Level — 700c

| LED output color | Blue | Blue-Green | Green | | Green-Yellow | Yellow | | Orange | | Red |
|---|---|---|---|---|---|---|---|---|---|---|
| Detected Temperature (°F) | ≤49.8 | 51.0 | 53.0 | 55.0 | 57.0 | 59.0 | 61.0 | 63.0 | 65.0 | 67.0 | 69.0 | 71.0 | 73.0 | ≥75.0 |

*FIG. 7*

TEMPERATURE MONITORING AND DISPLAY SYSTEM FOR DATA CENTERS

CROSS-REFERENCE TO RELATED APPLICATIONS

The present application claims the benefit of U.S. Provisional Patent Application Ser. No. 61/611,743, filed Mar. 16, 2012 by Anthony W. Gennello for a Temperature Monitoring System for Data Centers, which application is hereby incorporated by reference in its entirety.

BACKGROUND OF THE INVENTION

1. Field of the Invention

The invention relates generally to data centers and, more particularly, to systems for monitoring and presenting information concerning the temperature in data centers.

2. Background Information

Organizations, such as companies, educational institutions, and others, often install numerous pieces of computing equipment in centralized locations known as data centers. A data center, which may be located in a building, typically includes a large number of information technology (IT) and/or computing equipment, such as servers, switches, routers, storage systems, etc. The equipment is often rack-mounted within server cabinets located in the data center. As a result of the dense packing of the IT equipment in the server cabinets and in the data center, significant heat is generated within the data center. To prevent premature failure of the IT equipment, which might otherwise occur due to the excessive heat generated within the data center, cooling equipment, such as computer room air conditioning units (CRACs), is often installed to cool the data center and the IT equipment located therein. Nonetheless, localized "hot" spots may occur in the data center due, e.g., to different IT equipment loadings in the server cabinets, different operating characteristics of the equipment, different placement of the server cabinets within the data center, air flow patterns, etc. Significant time and resources are spent by managers of data centers identifying such "hot" spots, and taking corrective action.

SUMMARY OF THE INVENTION

Briefly, the invention relates to a temperature monitoring and display system for use in data centers. The system includes a plurality of components integrated to form a self-contained, packaged system. More specifically, the system may include a flexible printed circuit board (FPCB) and a magnetic layer. The magnetic layer is adapted for attaching the system to a component of a data center, such as a door or a frame of a server cabinet. Mounted to the FPCB are a plurality of lighting elements, such as multi-color light emitting diodes (LEDs) and a plurality of temperature sensors or transducers. The system also includes a programmable controller that is coupled to LEDs and to the temperature sensors. The controller may be configured to control the color output of the LEDs in response to temperature signals generated by the temperature sensors. The system may also include a data communication unit. The controller may be configured to encapsulate the temperature signals into one or more messages, and the data communication unit may be configured to transmit the one or more messages to a management station and/or to one or more user devices.

In an embodiment, the system is designed with a form factor configured to extend along the height of a server cabinet. For example, the system may be designed as an elongated strip having a length. The LEDs and the temperatures sensors may be distributed along the length of the strip. Furthermore, the controller may be configured to utilize the temperature signals of a given temperature sensor to control the color output by the LEDs adjacent or in proximity to that temperature sensor. For example, the LEDs may be organized into groups, and the groups may be associated with one or more of the temperature sensors located near the group of LEDs. The controller may operate each group of the LEDs based on the data signals generated by the associated temperature sensor. For example, the LEDs may be configured to output a plurality of colors in the color spectrum ranging from Red to Orange to Yellow to Green to Blue. The controller may command the LEDs in a respective group to output a particular color, based upon the value of the data signal generated by the associated temperature sensor.

In an embodiment, the controller maybe configured to operate in real-time. That is, the controller may acquire data from the temperature sensors, and control the appropriate LEDs in approximately one (1) second or less.

BRIEF DESCRIPTION OF THE DRAWINGS

The invention description below refers to the accompanying drawings, of which:

FIG. 7 is a schematic illustration of a plurality of sensitivity ranges in accordance with an embodiment of the present invention;

DETAILED DESCRIPTION OF ILLUSTRATIVE EMBODIMENTS

Figure 1:
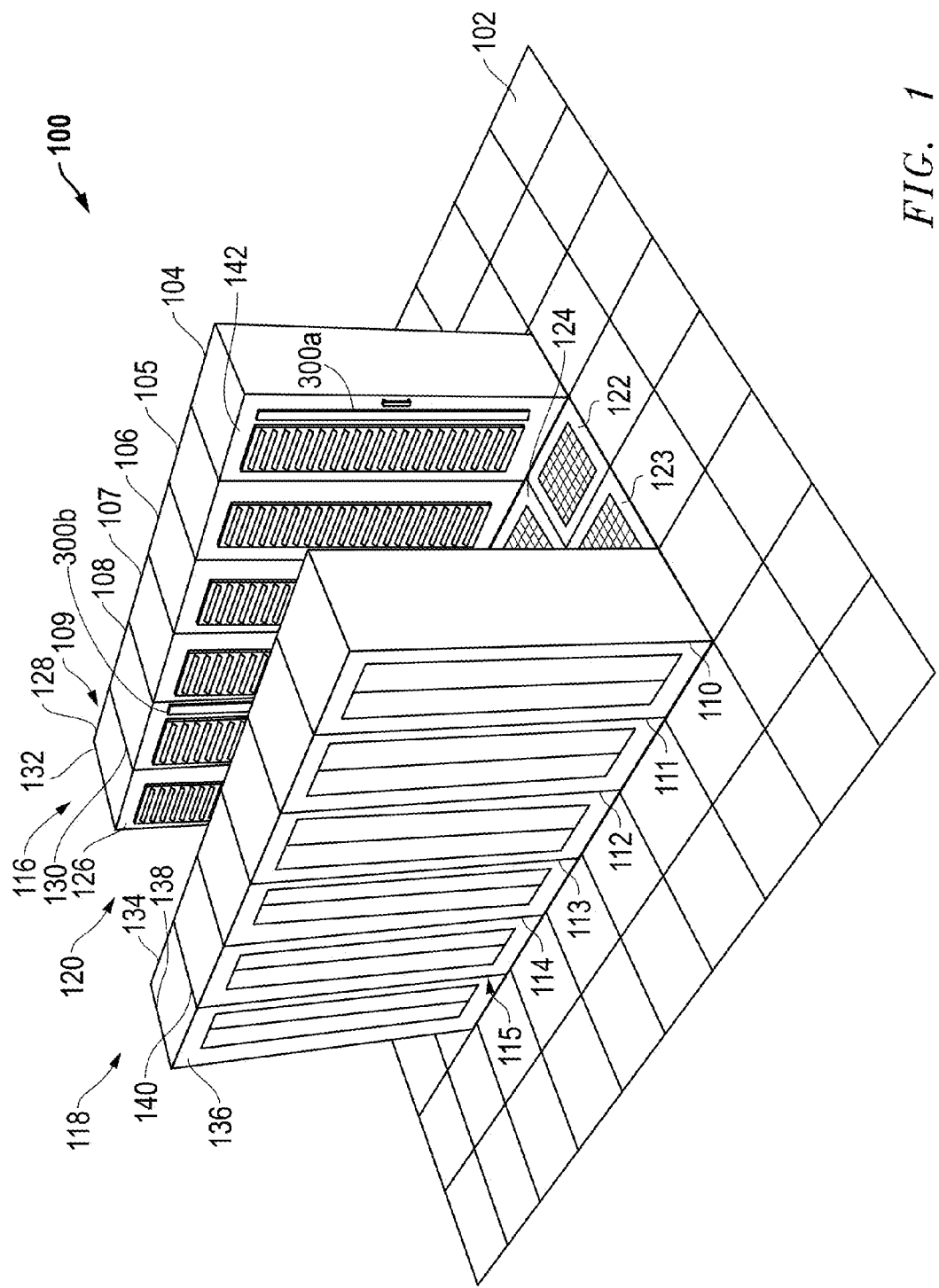
FIG. 1 is a schematic, isometric view of a data center in accordance with an embodiment of the present invention.

FIG. 1 is a schematic, isometric view of a data center 100. The data center 100 may have a floor 102 that supports a plurality of server cabinets, such as twelve server cabinets 104-115. Groups of server cabinets may be organized in rows, and the rows of cabinets may be spaced from each other so as to define aisles between the rows. For example, server cabinets one to six 104-109 may be organized as a first row 116, while server cabinets seven to twelve 110-115 may be organized as a second row 118. The two rows 116, 118 may be parallel to each other, and may define an aisle 120 therebetween. At least a portion of the floor 102 along the aisle 120 may include grates, such as grates 122-124, through which cooling air may be forced into the data center 100. The cooling air may be provided to a space, such as a plenum, below the floor 102 by one or more computer room air conditioning units (not shown). The aisle 120, which is configured to receive cool air, may be referred to as a "cold" aisle of the data center 100.

The server cabinets 104-115 may generally be in the shape of rectangular columns having a front, a back and two sides. In an embodiment, at least some of the server cabinets may conform to the 40U standard from the Electronic Industries Alliance (EIA). For example, server cabinet six 109 has a front 126, a back 128 and two sides 130, 132. Likewise, server cabinet twelve 115 may have a front 134, a back 136, and two sides 138, 140. A door may be mounted to the front of the server cabinets 104-115. For example, server cabinet one 104 has a door 142.

Inside the server cabinets 104-115 may be a plurality of rack mounted IT equipment, such as servers, routers, switches, power supplies, storage systems, etc. The IT equipment located in the server cabinets 104-115 generates heat, and this heat needs to be dissipated. Accordingly, one or more openings, such as a series of louvers, slats, or perforations may be formed in the doors of the server cabinets 104-115 so that cool air entering the data center 100, e.g., through floor grates 122-124, may flow into the server cabinets 104-115. In addition, one or more openings may be formed in the back of the server cabinets 104-115, to provide an air flow path through the cabinets. That is, cool air may flow into the server cabinets 104-115 from the front, and after cooling the IT equipment in the cabinets may exit out the back. Warmed air exiting the back of the server cabinets 104-115 may be withdrawn from the data center 100, and may be returned to the one or more computer room air conditioning units.

At least some of the IT equipment may include built-in fans that draw cool air into the server cabinet from the front, and discharge warm air out the back. Furthermore, some of the server cabinets may themselves include fans to draw cool air into and through the cabinets.

In an embodiment, of one or more temperature monitoring and display systems 300 may be disposed in the data center 100. For example, a first temperature monitoring and display system 300a may be mounted to the door 142 of server cabinet one 104. Other temperature monitoring and display systems 300 may be mounted to other server cabinets. For example, a second temperature monitoring and display system 300b may be mounted to the door of server cabinet five 108. In an embodiment, a temperature monitoring and display system 300 may be mounted to each high density cabinet. A high density cabinet may refer to a cabinet that is more than half full of IT equipment. A system 300 also may be mounted on the server cabinets located at the ends of the rows, such as server cabinets one, six, seven and twelve 104, 109, 110 and 115.

Figure 2:
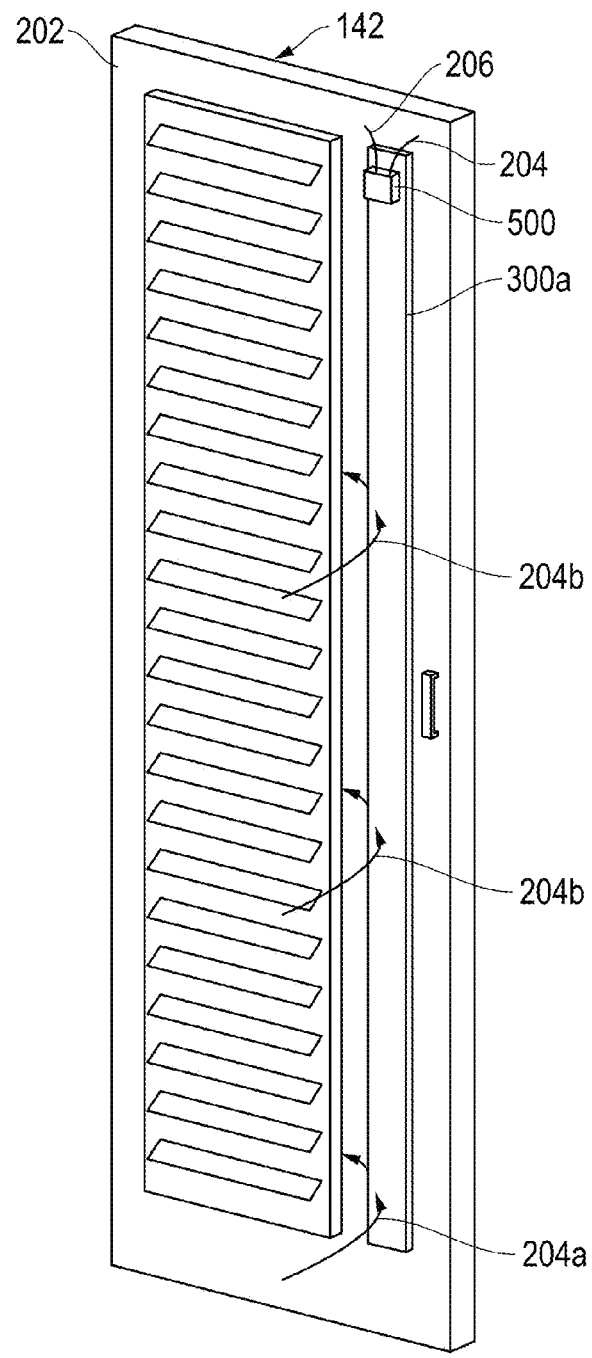
FIG. 2 is a schematic, isometric view of a door of a server cabinet having a temperature monitoring and display system mounted thereto according to an embodiment of the present invention.

FIG. 2 is an isometric view of the door 142 of the server cabinet 104. The temperature monitoring and display system 300a may be mounted to a front side 142a of the door 142. The temperature monitoring and display system 300a may include a controller 500. The controller 500 may have one or more antennae, such as a wireless data antenna 204, and a power cable 206. The power cable 206 may have a plug (not shown) for connecting the power cable 206 to a standard, e.g., 3-prong, electrical outlet.

The temperature monitoring and display system 300a is configured to measure the temperature of the air flowing through the system 300 from front to side and/or back, as indicated by arrows 204a-c. The system 300a is also configured to provide a visual indication of the air temperature along its length. A preferred mounting location for the system 300 is on the front of a server cabinet. Nonetheless, the system 300 may be mounted to the back of a server cabinet. In addition, if a server cabinet does not have a door, the system 300 may be mounted to the frame of the server cabinet, such as a vertical post located at the front (or back) of the server cabinet.

Figure 3:
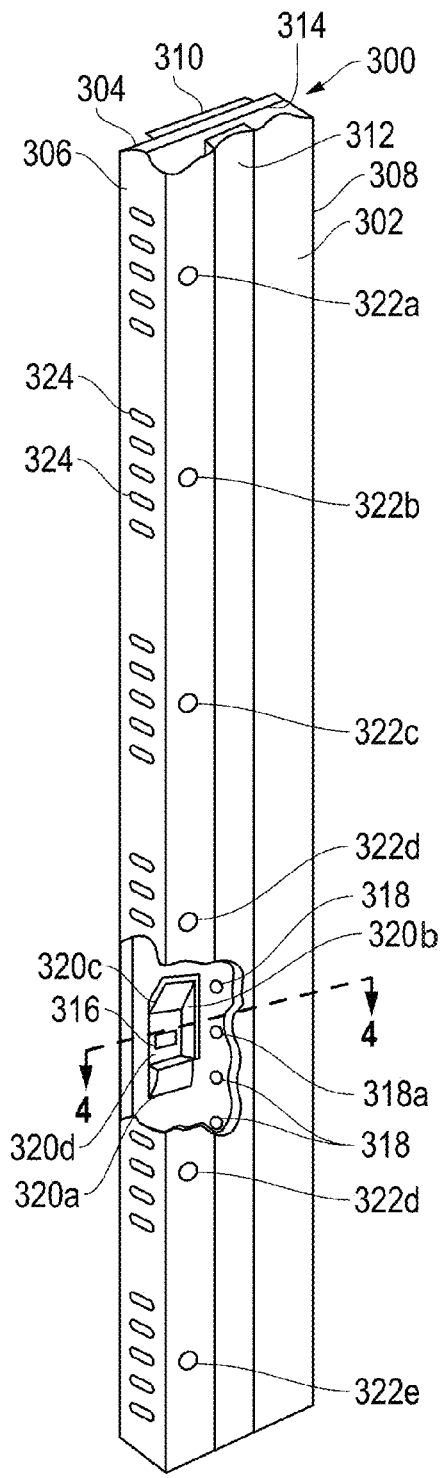
FIG. 3 is a schematic, cut-away isometric view of a temperature monitoring and display system in accordance with an embodiment of the present invention.
Figure 4:
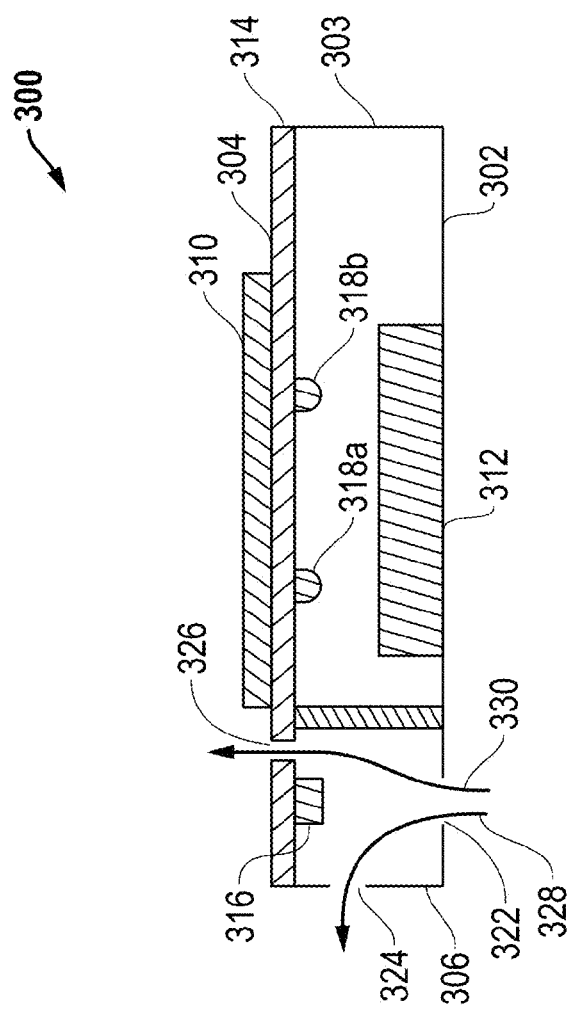
FIG. 4 is a schematic, cross-sectional view of the temperature monitoring and display system of FIG. 3 along lines 4-4.

FIG. 3 is a partial, cut-away isometric view of a temperature monitoring and display system 300 in accordance with an embodiment of the invention. FIG. 4 is a cross-sectional view of the temperature monitoring and display system 300 of FIG. 3 along lines 4-4. The system 300 may be in the form of a thin strip having a front 302, a back 304 and first and second sides 306, 308, and may be formed from a plurality of components. The components may be integrated to create a substantially self-contained, packaged system. In particular, the system 300 may include a magnetic strip or layer 310, a light diffuser 312 and a flexible printed circuit board (FPCB) 314. The magnetic strip 310 may be located along at least a portion of the back 304 of the system 300. The light diffuser 312 may be located along at least a portion of the front 302 of the system 300. The FPCB 314 may be located between the magnetic strip 310 and the light diffuser 312, and may also extend along at least a portion of the length of the system 300. In an embodiment, the magnetic layer 310, the light diffuser 312, and the FPCB 314 may extend substantially the entire length, e.g., height, of the system 300.

A plurality of components may be mounted to the FPCB 314. More specifically, a plurality of temperature sensors or transducers, such as temperature sensor 316, may be mounted on the FPCB 314. The plurality of temperature sensors 316 may be distributed in spaced-apart relation along the length of the system 300 in one or more vertically aligned columns. A plurality of light elements, such as multi-color light emitting diodes (LEDs) 318a-b, also may be mounted on the FPCB 314 in or more vertically aligned columns. In an embodiment, the plurality of LEDs 318 are arranged in two vertical columns extending along at least a portion of the length of the system 300 behind the light diffuser 312. The FPCB may be configured, e.g., with circuitry, to conduct power from a power unit of the system 300 to the controller 500, the temperature sensors 316 and the LEDs 318, and to deliver temperature signals from the temperature sensors 316 to the controller 500, and command and control signals from the controller 500 to the LEDs 318.

In an embodiment, the temperature sensors 316 may be mounted to the FPCB 314 in a thermally isolated manner. More specifically, the temperature sensors 316 may be partially or fully surrounded, e.g., enclosed, by an insulating material, such as one or more insulating panels 320a-d that are configured and arranged to thermally isolate the temperature sensor 316 from the back 304 of the system 300 and thus from the server cabinet to which the system 300 is mounted, as well as from the other components, such as the LEDs 318, the controller 500, etc., of the system 300 itself. In particular, a base panel 320d thermally isolates the temperature sensor 316 from the mounting surface of the server cabinet, and at least three side panels 320a-c thermally isolate the temperature sensor 316 from other components of the system 300. The temperature sensors 316 are thus isolated from heat transfer from the mounting surface, e.g., the cabinet door or the cabinet frame, and the other internal circuitry of the system 300. The temperature sensors 316 are thus configured to measure the temperature of the air entering the system 300, as opposed to the temperature of the server cabinet.

The temperature monitoring and display system 300 may include one or more air intake holes, such as holes 322a-e, formed along the front 302 of the system 300. The air intake holes 322 may be located over respective temperature sensors 316. The system 300 also may include one or more side vents, such as side vents 324, formed along the first side 306 of the system 300. Additionally or alternatively, the system 300 may include one or more rear vents, such as rear vents 326 (FIG. 4), formed along the back 304 of the system 300. The air intake holes 322, the side vents 324 and the rear vents 326 may be configured and arranged to allow air from the data center 100 to flow into the system 300, past the temperature sensors 316 and out of the system 300, as indicated by arrows 328 and 330 (FIG. 4). By omitting a fourth side panel of insulating material, air may flow past the temperature transducer 316 and out the side vents 324 and/or the rear vents 326.

It should be understood that other configurations of insulating material may be used. For example, the temperature sensors 316 may be completely surrounded by insulating materials, and holes may be formed in the insulating material to permit air to enter the system 300, flow past the temperature sensor 316 and out of the system 300.

The LEDs 318 may be configured to produce a plurality of colors in a color spectrum, such as the Red, Green, Blue (RGB) color spectrum. In an embodiment, the LEDs 318 may be configured to produce 129 different colors from Red to Yellow to Blue. That is, LEDs may be configured to output primary colors, secondary colors, tertiary colors, quaternary colors, quinary colors, etc.

Multi-color LEDs may be achieved by packaging a plurality of LEDs, each configured to emit a single color, into a single LED unit.

Suitable temperature sensors for the use with the present invention include the NTCG series of temperatures sensors from TDK Corp. of Tokyo Japan, such as the NTCG163JF103FT temperature sensor. Suitable LEDs include the HT-311FCH series of LEDs from Harvatek Corp. of Hsinchu City, Taiwan, such as the HT-311FCH-6603 LEDs. Suitable magnetic material includes the flexible magnets from Dura Magnetics, Inc. of Sylvania, Ohio, or other ferrite bonded to synthetic rubber. A suitable flexible printed circuit boards (FPCB) are available from San Francisco Circuits, Inc. of San Mateo, Calif., Flexible Circuit Technologies, Inc. of Minneapolis, Minn., and Flexible Circuits, LLC of Northfield, Minn., among others. Nonetheless, other materials and components may be utilized. For example, a rigid Printed Circuit Board (PCB) may be used in place of the FPCB.

In an embodiment, the system 300 may be approximately 70 inches long, 1.75 inches wide and 0.45 inches thick, and may include eight temperature sensors and 64 multi-color LEDs. The temperature sensors 316 may be arranged in one vertical column, and may be spaced at eight inch intervals, with the first sensor located approximately 4.5 inches from the bottom of the system 300. The LEDs may be arranged in the two vertical columns, and may be spaced at one (1) inch intervals.

In an embodiment, the entire system 300 is flexible, and may be rolled up, e.g., for shipping and/or storage. The system 300 may be attached to the door of a server cabinet by unrolling it from the rolled condition, and applying the magnetic layer side to the cabinet door (or other portion of the server cabinet). To the extent the system 300 is formed from rigid components, such as a rigid Printed Circuit Board (PCB), the magnetic layer side may be applied to the door of the cabinet or other attachment point. The system 300 may also be easily removed from the server cabinet simply by pulling the system away with enough force to overcome the magnetic attraction that otherwise holds the system 300 in place on the server cabinet. The system 300 is thus portable, and may be positioned (and re-positioned) at one or more desired locations within the data center by the user.

The LEDs 318 may be organized into groups, and each group may be associated with at least one of the temperature sensors 316. For example, the group of LEDs 318 located nearest a temperature sensor 316 may be associated with, e.g., controlled to generate a color and/or intensity, based on the reading from that temperature sensor 316. For example, the controller 500 may provide a Pulse Width Modulation (PWM) control signal to the LEDs 106, and the particular color emitted by the LEDs may depend on the frequency of the PWM control signal. Accordingly, the groups of LEDs provide an indication of the air temperature at the location of the group of LEDs. That is, the LEDs 318 of the system 300 indicate localized temperature by outputting a particular color. In an embodiment, the system 300 may not display any numeric, e.g., digital or dial-based, temperature readings. Instead, temperature information may be conveyed, e.g., to a manager or operator of the data center 100, by color alone. By simply looking at the colors displayed along the length of the system 300, the manager or operator can quickly see if a hot spot exists or is developing. In an embodiment, the system 300 is configured so that the colors emitted by the LEDs 318 are visible by the manager or operator of the data center 100 from up to 20 feet away from the system 300.

Other suitable controllers for use with the present invention besides PWM controllers, include microcontrollers, Digital Signal Processors, Field Programmable Gate Arrays (FPGAs), Application Specific Integrated Circuits (ASICs), etc. Suitable temperatures sensors for use with the present invention include thermocouples, resistive temperature devices, infrared sensors, bimetallic devices, change-of-state sensors, and silicon diodes. Suitable LEDs for use with the present invention include tricolor LEDs that produce Red, Blue, and Green whose intensities may be controlled to provide a broader color spectrum, e.g., Blue, Green, Yellow, Orange, and Red. The power unit 114 may connect to a conventional power supply (120 v/60 Hz AC electrical power) and may convert or transform that power to a form used by the controller (3 v DC electrical power).

Figure 5:
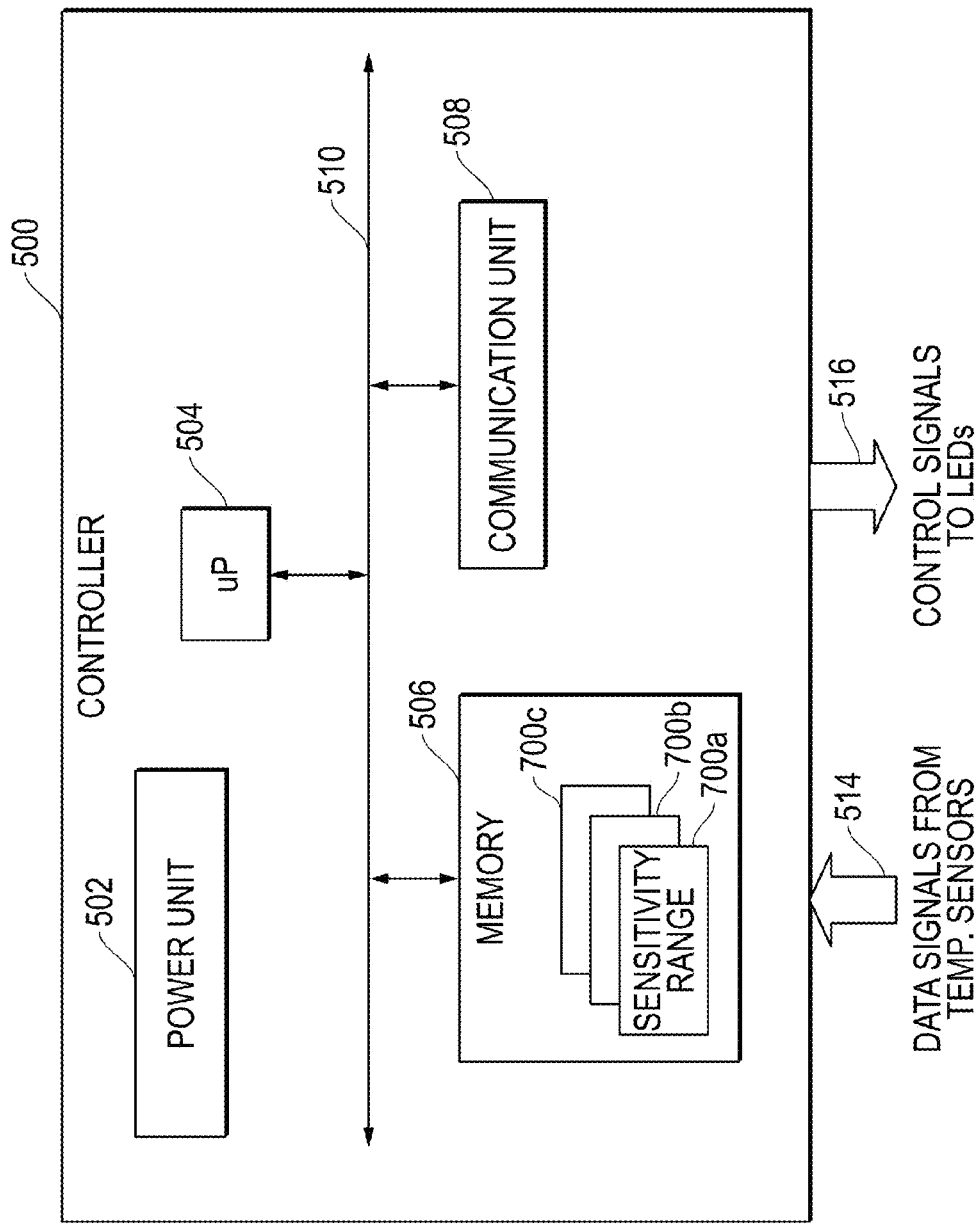
FIG. 5 is a schematic diagram of a controller in accordance with an embodiment of the present invention.

FIG. 5 is a highly schematic, functional block diagram of the controller 500 of the system 300. The controller 500 may include a power unit 502, a processor, such as a microprocessor 504, one or more memories, such as memory 506, and a communication unit 508. The microprocessor 504, memory 506 and communication unit 508 may be coupled by one or more busses, such as a system bus 510. In an embodiment, the memory 506 may be configured to store one or more sensitivity ranges, such as sensitivity ranges 700a-c, that may be used by the microprocessor 504 to control the LEDs based on data signals from the temperature sensors. That is, the controller 500 may be configured to receive data signals from the temperature sensors 316, as indicated by arrow 514, and to provide control signals to the LEDs 318, as indicated by arrow 516. The microprocessor 504 may be configured to receive a data signal generated by a given temperature sensor and, to compute a temperature reading based on that signal. For example, the temperature sensor 316 may output a digital or analog signal, and the FPCB may include one or more Analog-to-Digital (A/C) converters and other signal processing circuitry, such as one or more filters.

Based on the selected sensitivity range 700, the controller 500 also may be configured to control the one or more LEDs 318 associated with the given temperature sensor 316 to operate at a particular color and/or intensity, based on the computed temperature reading. For example, as the temperature reading by a given temperature sensor 316 increases, the microprocessor 504 may control the one or more LEDs 318 associated with the given temperature sensor 316 to phase or modulate along the color spectrum from blue to green to yellow to orange to red. It should be understood that the LED 318 may modulate among numerous other intermediary colors as well, such as orange-red, yellow-orange, green-yellow, blue-green, etc. Likewise, as the temperature reading for the given temperature sensor 316 decreases, the microprocessor 504 may control the one or more LEDs 318 to modulate or phase along the color spectrum from red to orange to yellow to green to blue.

It should be understood that other color schemes besides RGB may used. For example, the LEDs 318 may be configured to utilize at least a portion of the Cyan, Magenta, and Yellow (CYM) color scheme.

Figure 6:
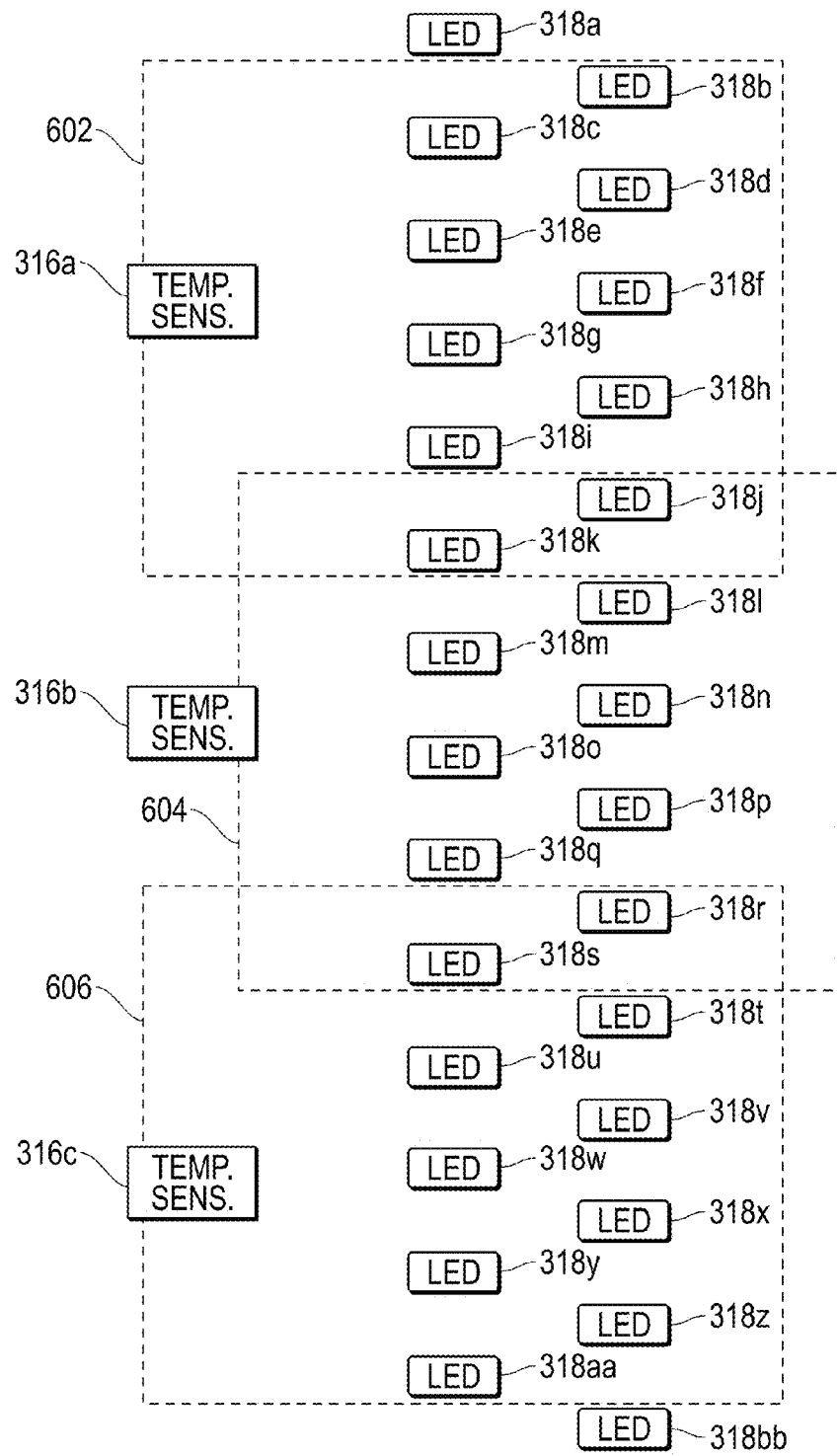
FIG. 6 is a schematic, front view of an association of LEDs to temperature sensors in accordance with an embodiment of the present invention.

FIG. 6 is a schematic, front view of an association among LEDs and temperature sensors according to an embodiment of the invention. FIG. 6 illustrates three temperature sensors 316a-c and 28 multi-color LEDs 318a-bb. In the embodiment, each temperature sensor 316 is associated with ten multi-color LEDs 318 as schematically illustrated by the dashed boxes 602, 604, and 606. Specifically, the first temperature sensor 316a is associated with LEDs 318a-k. The second temperature sensor 316b is associated with LEDs 318j-s. The third temperature sensor 316c is associated with LEDs 318r-aa. In this embodiment, some LEDs 318 are "shared" by adjacent temperature sensors 316. For example, LEDs 318j and 318k are "shared" by temperature sensors 316a and 316b. Also, LEDs 318r and 318s are "shared" by temperature sensors 318b and 318c. The LEDs 318 that are associated with a single temperature sensor 316, i.e., are not shared, may be controlled to display a color associated with the temperature reading of the given temperature sensor 316. For an LED 318 that is "shared", e.g., by two temperature sensors 316, the microprocessor 504 may be configured to compute an average of the temperature readings from the two temperature sensors 316, and use this computed average value to control the color output by the "shared" LED 318. In this manner, a smoother color transition may be achieved between adjacent groups of LEDs.

It should be understood that other control paradigms may be employed. For example, weightings may be used with the temperature readings of temperature sensors that share LEDs. In particular, a weighted average may be computed from the temperature readings from two temperature sensors that more heavily weighs the reading from the temperature sensor closer to the one or more shared LEDs. An algorithm for an exemplary weighted average is:

$$\text{weighted\_temperature} = \frac{1.2 * (\text{near temperature reading}) + 0.8 * (\text{far temperature reading})}{2}$$

where, 1.2 and 0.8 are the assigned weights.

It should be understood that other weights and/or weighted average algorithms may be used.

In addition, a straight average may be used for the one or more shared LEDs that are evenly located between the first and second temperature sensors.

FIG. 7 is a schematic illustration of the sensitivity ranges 700a-c in accordance with an embodiment of the present invention. Each sensitivity range 700a-c may provide a mapping of temperature (or a range of temperatures) to LED color. That is, each sensitivity range 700a-c specifies the color to be output by an LED for a given temperature, as measured by the temperature sensor or sensors associated with that LED. Each sensitivity 700a-c may be organized as a table or array having rows and columns whose intersections define cells for storing information or data. A first row indicates the output color, and a second row indicates the corresponding temperatures. Each sensitivity range 700a-c may cover a different temperature span. For example, the first sensitivity range 700a may cover a temperature range from approximately 69.8° F. to approximately 95° F., and may be referred to as a "high" sensitivity range. The second sensitivity range 700b may cover a temperature range from approximately 64.8° F. to approximately 90.0° F., and may be referred to as a middle or "mid" sensitivity range. The third sensitivity range 700c may cover a temperature range from approximately 49.8° F. to approximately 75.0° F., and may be referred to as a low sensitivity range. Each sensitivity range 700 spans the color range from Blue through Green and Yellow to Red.

A user may configure the controller 500 of a system 300 to use a selected one of the sensitivity ranges 700-c when controlling the LEDs 318 of that system 300. In an embodiment, the controller 500 may be configured to utilize the mid range 700b as a default sensitivity range.

The sensitivity ranges 700 may be stored in the memory 506 as tables, arrays, lists or other data structures.

The controller 500 may also be configured to control the intensity of the color being display by an LED 318 based on the temperature reading. For example, if the temperature reading is 76° F., the corresponding LED 318 may be controlled to display a light (low intensity) yellow. If the temperature reading is 80° F., the corresponding LED may be controlled to display a bright (high intensity) yellow.

Figure 8:
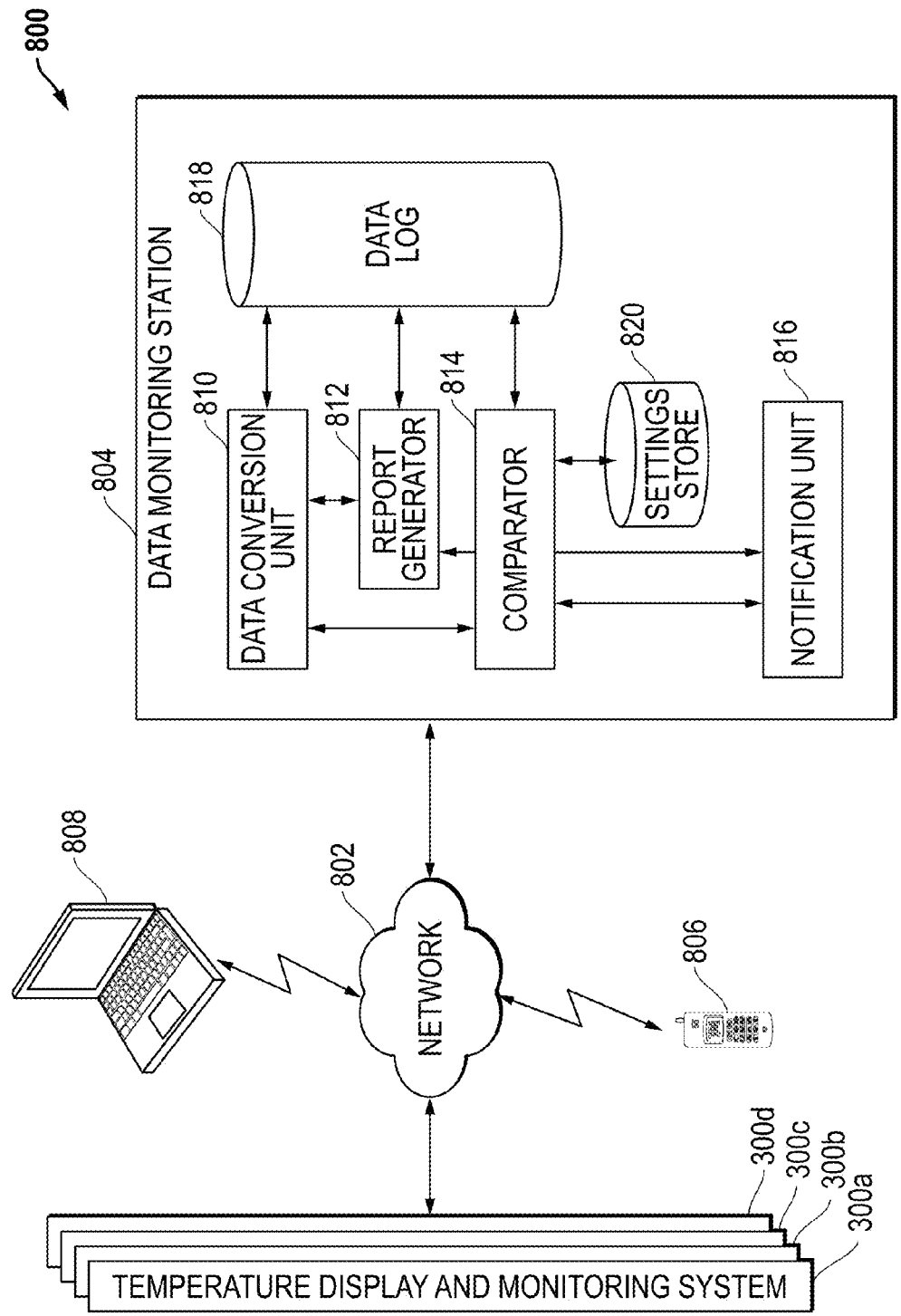
FIG. 8 is a schematic diagram of a data monitoring environment in accordance with an embodiment of the present invention.

FIG. 8 is a schematic illustration of a data monitoring environment 800 in accordance with an embodiment of the invention. The environment 800 may include one or more temperature monitoring and display systems, such as systems 300a-d, at least one data communication network, such as network 802, a data monitoring station 804, and one or more user devices, such as a first user device 806 and a second user device 808. The temperature monitoring and display systems 300a-d, the data monitoring system 804, and the user devices 806, 808 may each be coupled to the network 802, e.g., using wireless or wired data communications protocols and equipment, so that they may be able to exchange information.

The data monitoring station 804 may include a plurality of components. For example, the data monitoring station 804 may include a data conversion unit 810, a report generator 812, a comparator 814, and a notification unit 816. The data monitoring station 804 also may include at least one data log 818 and a settings store 820. The data monitoring station 804 may be a data processing entity, such as a server or workstation, having a plurality of hardware elements including one or more processors, such as a central processing unit (CPU), one or more memories, such as a main memory, e.g., Random Access Memory (RAM), and a persistent memory, e.g., flash memory and/or hard disk drives, a networking element, such as a network interface card (NIC), and a bus. The memories may an operating system (OS) as well as one or modules running on top of the OS and containing instructions executable by the CPU. The data conversion unit 810, the report generator 812, the comparator 814 and the notification unit 816 may be implemented as applications running on top of the OS. The data log 818 and the settings store 820 may be implemented as data structures stored in the memories. The executable instructions also may be stored on computer readable media, such as magnetic, optical or magneto-optical media.

The network 802 may include one or more Local Area Networks (LANs), Wide Area Networks (WANs), and other networks, such as the Internet. The user devices 806, 808 may be data processing devices. For example, the first user device 806 may be smart phone, and the second user device 808 may be a laptop computer. It should be understood that other or additional user devices may be used, such as desktop computers, tablet computers, electronic-readers, etc.

Figure 9A:
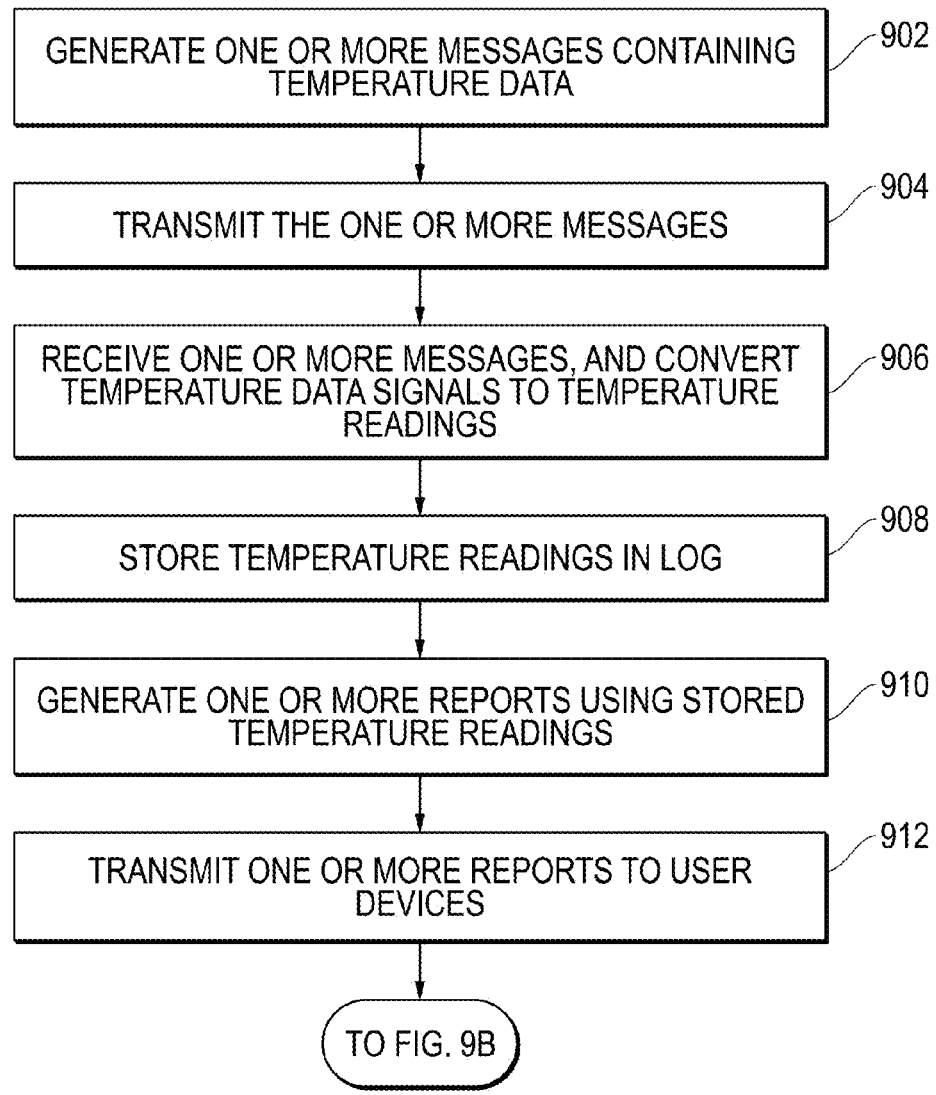
FIGS. 9A and 9B is a flow diagram of a method in accordance with an embodiment of the present invention.
Figure 9B:
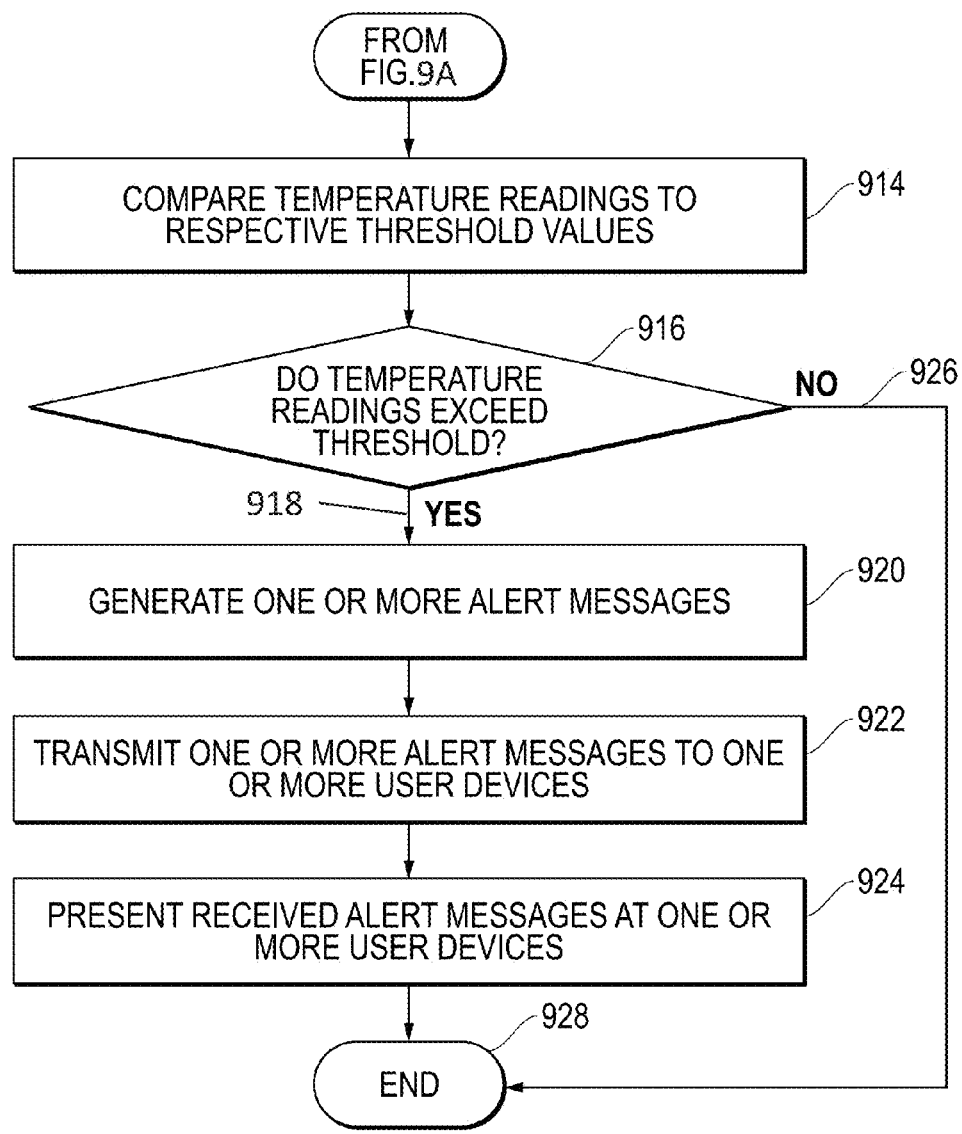

FIGS. 9A and 9B is a flow diagram of a method in accordance with an embodiment of the present invention. The temperature monitoring and display system 300 may generate one or more messages containing temperature data generated by at least some of the temperature sensors, as indicated at block 902. The messages also may include information identifying the temperature monitoring and display system 300 and the temperature sensors that generated the data. That is, unique identifiers (IDs) may be assigned to the systems 300a-d and to the temperature sensors 316. The temperature monitoring and display system 300 may transmit the one or more messages to the data monitoring system 804 via the network 802, as indicated at block 904. The data communication unit 508 may communicate with the data monitoring station 804 and/or the devices 806 and 808 by exchanging packets or messages according to a predefined set of protocols, such as the MODBUS serial communication protocol, the Transmission Control Protocol/Internet Protocol (TCP/IP), although it should be noted that other protocols, such as the HyperText Transfer Protocol (HTTP), may be used with the invention. In an alternative embodiment, a circuit switching network, such as the Integrated Services Digital Network (ISDN), or other type of computer networking technology may be employed. For example, a network utilizing the Peripheral Component Interconnect Express (PCIe) expansion bus architecture could also be utilized. The data communication unit 508 may contain the mechanical, electrical and signaling circuitry needed to connect the system 300 to a computer network, such as the network 802, and/or bus to thereby facilitate communication over the network or bus. To that end, the data communication unit 508 may be configured to transmit and/or receive messages using a variety of communication protocols including Simple Network Management Protocol (SNMP), TCP/IP, HTTP, Uniform Serial Bus (USB), General Purpose Interface Bus (GPIB), etc.

The data conversion unit 810 at the data monitoring system 804 may receive the messages, and to the extent the data is raw signal data, may convert the signal data into temperature readings, as indicated at block 906. The system 300 may be configured to transmit temperature data signals and/or derived temperature readings. The data conversion unit 810 may also store the readings in the data log 818, as indicated at block 908. The report generator 812 may access the temperature readings stored in the data log 818, and may generate one or more reports containing that information, as indicated at block 910. The report generator 812 may provide the one or more reports to the notification unit 816 which may, in turn, transmit the reports to the user devices 806, 808, as indicated at block 912.

The report generator 812 may be configured to generate a report periodically, e.g., daily, weekly and/or monthly, that illustrates the trends of the temperature readings of one or more temperature monitoring and display systems 300. As indicated, the reports may be provided to the notification unit 816 for transmission to the user devices 806, 808. Alternatively or additionally, the reports may be accessed from the data monitoring system 804 by the user devices 806, 808. The user may also specify the frequency of the reporting, and the format and information included in the reports created by the report generator 812.

The data conversion unit 810 also may provide the temperature readings to the comparator 814. Alternatively, the comparator 814 may access the temperature readings from the data log 818. The comparator 814 may compare the temperature readings to threshold values stored in the settings store 820, as indicated at block 914 (FIG. 9B), and determine whether a particular temperature reading exceeds a threshold value for that system 300 or temperature sensor 316, as indicated at decision block 916. If the comparator 814 determines that a particular temperature reading exceeds the threshold value associated with the system 300 or temperature sensor 316 that generated the reading, the comparator 814 may inform the notification unit 816, which in turn may generate one or more alert messages, as indicated by Yes arrow 918 leading to block 920.

For example, suppose a temperature reading of 83° F. is detected, and that the threshold value for the system 300 and/or temperature sensor 316 that generated that reading is 80° F. In this case, the comparator 814 may determine that the reading exceeds the threshold value. The one or more alert messages may contain information regarding the temperature reading that exceeds its threshold value and the identity and/or location of the system 300, e.g., within the data center 100. The notification unit 816 may transmit the one or more alert messages to the user devices, such as first device 808 and/or second device 810, as indicated at block 922. The user devices 806, 808 may present, e.g., display, the received alert messages, as indicated at block 924. The notification unit 816 may be configured to transmit the one or more alert messages as text messages, email messages, voice messages, etc.

Returning to decision block 916, if the temperature readings do not exceed the associated threshold values, processing may complete, as indicated by No arrow 926 leading to end block 928. For example, where the threshold value is 80° F. and the temperature reading is 75° F., then the comparator 814 may determine that the reading does not exceed the associated threshold.

In an embodiment, a user may specify the threshold values stored in the settings store 820. In addition, the user may specify the mobile phone numbers or email addresses, etc. to be used for alert messages.

The foregoing description has been directed to specific embodiments of the present invention. It will be apparent, however, that other variations and modifications may be made to the described embodiments, with the attainment of some or all of their advantages. For example, the magnetic strip may be omitted and system may be attached to server cabinet using fasteners, such as zip or cable ties, hook and loop fasteners, adhesives, doubled sided tape, etc. In another embodiment, the system may be formed from rigid, rather than flexible, components. Therefore, it is the object of the appended claims to cover all such variations and modifications as come within the true spirit and scope of the invention.

What is claimed is:

1. A temperature monitoring and display system comprising:
    a magnetic strip;
    a printed circuit board (PCB);
    a plurality of lighting elements mounted along a length of the PCB, the plurality of lighting elements configured to emit a range of colors;

a plurality of temperature sensors mounted along the length of the PCB, the plurality of temperature sensors adapted to generate temperature signals for air in a data center; and a controller coupled to the plurality of lighting elements and to the plurality of temperature sensors, the controller configured to receive the temperature signals generated by the temperature sensors, and direct the lighting elements to emit predetermined colors based on the temperature signals generated by the temperature sensors.

2. The temperature monitoring and display system of claim 1 wherein at least some of the plurality of lighting elements are multi-color light emitting diodes (LEDs).

3. The temperature monitoring and display system of claim 1 wherein the lighting elements are organized into groups, the groups of lighting elements are associated with respective ones of the temperature sensors, and the controller is further configured to direct at least some of the lighting elements of the groups based on the temperature signals generated by the temperature sensors associated with the groups.

4. The temperature monitoring and display system of claim 3 wherein the groups are adapted to include adjacent lighting elements.

5. The temperature monitoring and display system of claim 1 wherein the PCB is a flexible printed circuit board (FPCB), and the magnetic strip is flexible.

6. The temperature monitoring and display system of claim 1 wherein at least some of the plurality of temperature sensors are located in a thermally isolating housing.

7. The temperature monitoring and display system of claim 1 further comprising:

a diffuser mounted over the plurality of lighting elements.

8. The temperature monitoring and display system of claim 1 wherein the plurality of lighting elements are organized in groups, the temperature sensors are associated with respective ones of the groups of lighting elements, and the controller is configured to direct the lighting elements of a given group based on the temperature signals generated by the temperature sensor associated with the given group.

9. The temperature monitoring and display system of claim 1 wherein the controller is configured to operating the plurality of lighting elements in real time.

10. The temperature monitoring and display system of claim 1 further comprising a cover extending over the plurality of temperature sensors, the cover having a plurality of air inlet holes and a plurality of vent holes in proximity to the plurality of temperature sensors, the plurality of air inlet holes and the plurality of vent holes adapted to establish an airflow from outside the system through the plurality of air inlet holes, past the plurality of temperature sensors, and out the plurality of vent holes.

11. The temperature monitoring and displaying system of claim 1 wherein the plurality of temperature sensors and the plurality of lighting elements are distributed substantially evenly along the length of the PCB.

12. The temperature monitoring and displaying system of claim 1 wherein the length of the PCB is selected such that the system extends substantially along a height of a server cabinet.

13. The temperature monitoring and displaying system of claim 1 wherein the predetermined colors include a portion of a Red Green Blue (RGB) color spectrum.

14. The temperature monitoring and displaying system of claim 13 wherein the predetermined colors extend from Red to Orange to Yellow to Green to Blue of the RGB color spectrum.

15. The temperature monitoring and displaying system of claim 1 wherein the predetermined colors are set forth in a sensitivity range, and the controller is configured to utilize the sensitivity range to direct the lighting elements.

16. The temperature monitoring and displaying system of claim 15 wherein the sensitivity range stores a mapping of temperatures to colors.

17. The temperature monitoring and displaying system of claim 1 further comprising:

a memory coupled to the controller, the memory configured to store a plurality of sensitivity ranges, the sensitivity ranges mapping temperatures to colors, wherein the controller is further configured to utilize a selected one of the plurality of sensitivity ranges to direct the lighting elements.

18. The temperature monitoring and displaying system of claim 1 further comprising:

a communication unit coupled to the controller, wherein the controller is further configured to generate one or more messages containing the temperature signals generated by at least some of the temperature sensors, and communication unit, and the communication unit is configured to transmit the one or more messages containing the temperature signals.

19. The temperature monitoring and displaying system of claim 18 wherein a system identifier (ID) is assigned to the system, and the one or more messages further contain the system ID.

* * * * *